US010740628B2

(12) United States Patent
Tatsubori

(10) Patent No.: US 10,740,628 B2
(45) Date of Patent: *Aug. 11, 2020

(54) METHODS AND SYSTEMS FOR MOVING TRAFFIC OBSTACLE DETECTION

(71) Applicant: International Business Machines Corporation, Armonk, NY (US)

(72) Inventor: Michiaki Tatsubori, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/859,382

(22) Filed: Dec. 30, 2017

(65) Prior Publication Data

US 2018/0121741 A1     May 3, 2018

Related U.S. Application Data

(63) Continuation of application No. 15/464,103, filed on Mar. 20, 2017, now Pat. No. 10,176,389.

(30) Foreign Application Priority Data

Jun. 9, 2016 (KE) ................ P/2016/2501

(51) Int. Cl.
*G06K 9/00* (2006.01)
*G06K 9/46* (2006.01)
(Continued)

(52) U.S. Cl.
CPC ....... *G06K 9/00805* (2013.01); *G05D 1/0088* (2013.01); *G05D 1/0238* (2013.01); *G06K 9/4633* (2013.01); *G08G 1/0112* (2013.01); *G08G 1/0129* (2013.01); *G08G 1/0133* (2013.01); *G08G 1/0141* (2013.01); *G08G 1/04* (2013.01); *G08G 1/09675* (2013.01); *G08G 1/096716* (2013.01); *G08G 1/096725* (2013.01); *G08G 1/096775* (2013.01); *G08G 1/164* (2013.01); *G08G 1/165* (2013.01); *G01C 21/34* (2013.01)

(58) Field of Classification Search
None
See application file for complete search history.

(56) References Cited

U.S. PATENT DOCUMENTS 3,069,654 A    12/1962   Hough
2014/0195138 A1*   7/2014   Stelzig ................ G08G 1/0116
                                               701/119

(Continued)

OTHER PUBLICATIONS

Robust Environment Perception for the Audi Autonomous Driving Cup. Kuhnt et al. Nov. 2016.*

(Continued)

*Primary Examiner* — Delomia L Gilliard
(74) *Attorney, Agent, or Firm* — Shimon Benjamin; Otterstedt, Wallace & Kammer, LLP

(57) ABSTRACT

The disclosure provides systems and methods for detecting, characterizing, and predicting moving traffic obstacles. The systems and methods are suitable for densely populated areas in resource-constrained regions. With the characterizations and predictions of moving traffic obstacles, a variety of benefits can accrue to individuals and devices that use traffic information.

15 Claims, 8 Drawing Sheets

(51) Int. Cl.

| | |
|---|---|
| *G05D 1/02* | (2020.01) |
| *G05D 1/00* | (2006.01) |
| *G08G 1/04* | (2006.01) |
| *G08G 1/01* | (2006.01) |
| *G08G 1/0967* | (2006.01) |
| *G08G 1/16* | (2006.01) |
| *G01C 21/34* | (2006.01) |

(56) References Cited

U.S. PATENT DOCUMENTS

2016/0014394 A1   1/2016  Suhr et al.
2017/0010618 A1*  1/2017  Shashua ................. G01C 21/32
2017/0357862 A1  12/2017  Tatsubori et al.

OTHER PUBLICATIONS

H. Eren et al. 2012, Estimating driving behavior by a smartphone, Intelligent Vehicles Symposium (IV), 2012 IEEE, Jun. 3-7, 2012, pp. 234-239 (abstract only pp. 1-3).

RS Stephens, Probabilistic Approach to the Hough Transform, Feb. 1991, Image and Vision Computing, vol. 9, Issue 1, pp. 66-71 (abstract only pp. 1-3).

Paul J. Otterstedt, List of IBM Patents or Patent Applications Treated As Related, Sep. 10, 2018, pp. 1-2.

* cited by examiner

METHODS AND SYSTEMS FOR MOVING TRAFFIC OBSTACLE DETECTION

CROSS-REFERENCE TO RELATED APPLICATIONS

This application is a continuation of U.S. patent application Ser. No. 15/464,103 filed 20 Mar. 2017, the complete disclosure of which is expressly incorporated herein by reference in its entirety for all purposes, which in turn claims foreign priority to Kenyan application KE/P/2016/2501 filed Jun. 9, 2016 and entitled METHODS AND SYSTEM FOR MOVING TRAFFIC OBSTACLE DETECTION, the complete disclosure of which is also expressly incorporated herein by reference, in its entirety, for all purposes.

BACKGROUND

In embodiments, the technical field of the invention is methods and systems for detecting and managing moving traffic obstacles.

Traffic congestion in developing cities like Nairobi, Kenya can be significantly impacted by the presence of "Moving Traffic Obstacles" (MTOs). These MTOs are those events that temporarily exist on the road, moving with or against the direction of traffic at slower speeds. They include two-wheelers, pushcarts, animals, and pedestrians, which have quite different influence on traffic compared with static obstacles, such as potholes and speed bumps.

The existing sophisticated tools for detecting road obstacles can be prohibitively expensive and often unpractical to deploy in developing countries. Smartphones and supporting 3G infrastructure are wide spread even in developing countries and have great potential to be used to improve traffic quality and safety because they are relatively low-cost, ubiquitous, and carry a suite of sensors that can be used to measure the movement of vehicles.

SUMMARY OF THE INVENTION

This invention addresses in part and in embodiments the problem of multiple moving traffic obstacles detection from spatiotemporally sparse and probabilistic observations from smartphone-based prove cars. Herein is introduced an algorithm based on the Hough Transform but extended to work with observations from probabilistic classifiers. The methods and systems herein have a better foundation with mathematical formulation for Probabilistic Hough Transform.

In an aspect, then, is a method for maneuvering a vehicle in a roadway having potential traffic obstacles, the method comprising: establishing a communications link between a server and a device in a vehicle; and communicating an alert to the device, wherein the alert is configured to cause the vehicle to maneuver based on a potential moving traffic obstacle path, wherein the potential moving traffic obstacle path is determined based on sensor data for a road segment, the sensor data corresponding to observations of an obstacle at a location along the road segment over a period of time. In embodiments:

the sensor data is obtained from one or more sensors selected from: an onboard sensor on one or more probe vehicles as the one or more probe vehicles traverses the road segment; a fixed location sensor monitoring the road segment; and a combination thereof;

the sensor data corresponds to observations of one or more obstacles at one or more locations along the road segment over a period of time;

the alert is generated when the vehicle comes into proximity of the potential moving traffic obstacle path;

the alert is generated when the vehicle comes into proximity such as within the same road segment or an adjacent road segment of the potential moving traffic obstacle path;

the alert is generated when the vehicle comes into proximity of the potential moving traffic obstacle path, and wherein the alert is configured to alter a user interface to display information suitable to cause a driver to initiate a maneuver, or wherein the alert is configured to cause an autonomous vehicle control system to initiate a maneuver;

determination of the potential moving traffic obstacle path involves: receiving the sensor data for the road segment by a server via a network; determining a set of gray scale pixels potentially missing based on the observations, each pixel representing a time and location combination, and having an associated obstacle probability assigned based on the sensor data; applying a modified Probabilistic Hough Transform to the set of gray scale pixels to obtain a Hough Transform space, wherein each value in the Hough Transform space is a log likelihood supported or opposed by each observation; and identifying the potential moving traffic obstacle path by identifying a linear arrangement of locally maximum peak values in the Hough Transform space;

the potential moving traffic obstacle path is stored in a potential moving traffic obstacle path database;

the communication is configured to cause a change in a graphical user interface on the device such that a user is notified of the potential moving traffic obstacle and is further notified of a suggested maneuver based on the potential moving traffic obstacle;

the communication is configured to cause a change in a graphical user interface on the device such that a user is notified of the potential moving traffic obstacle and is further notified of a suggested maneuver based on the location, direction, speed, and/or identity of the potential moving traffic obstacle;

the communication is configured to cause a change in a graphical user interface on the device such that a user is notified of the potential moving traffic obstacle and is further notified of a suggested maneuver based on the location, direction, speed, and/or identity of the potential moving traffic obstacle and wherein the user maneuvers the vehicle based on the communication;

the communication is configured to cause an autonomous vehicle control system to maneuver based on the potential moving traffic obstacle;

the sensor data originates from one or more vehicles traversing the road segment, and wherein the one or more vehicles is a dedicated probe vehicle or is a non-dedicated vehicle having a mobile device configured to collect and transmit the sensor data; and the sensor data is from a camera, accelerometer, gyroscope, or combination thereof.

In an aspect is a method for maneuvering a vehicle in a roadway having potential traffic obstacles, the method comprising: receiving sensor data for a road segment, the sensor data corresponding to observations of an obstacle at a location along the road segment over a period of time; determining a set of grey scale pixels potentially missing based on the observations, each pixel representing a time and location combination, and having an associated obstacle probability assigned based on the sensor data; applying a modified Probabilistic Hough Transform to the set of grey scale pixels to obtain a Hough Transform space, wherein each value in the Hough Transform space is a log likelihood supported or opposed by each observation; identifying a potential moving traffic obstacle path by identifying a linear arrangement of locally maximum peak values in the Hough Transform space; adding the potential moving traffic obstacle path to a potential moving traffic obstacle database; communicating an alert to a device in a vehicle, wherein the communication comprises the potential moving traffic obstacle path and is configured to cause the vehicle to maneuver based on the potential moving traffic obstacle path. In embodiments:

each value in the Hough Transform space is an existence probability score supported or opposed by each observation;

the vehicle receiving the alert is located in the road segment or an adjacent road segment; and each pixel has an associated obstacle probability assigned based on the sensor data if the data is not missing.

In an aspect is a method for instructing a vehicle to maneuver in a roadway, the method comprising: processing, by a server, sensor data received by the server from at least one device comprising a sensor, the sensor data corresponding to observations of an obstacle at a location along a road segment over a period of time, the processing comprising the steps: (a) determining a set of gray scale pixels potentially missing based on the observations, each pixel representing a time and location combination, and having an associated obstacle probability assigned based on the sensor data; (b) applying a modified Probabilistic Hough Transform to the set of gray scale pixels to obtain a Hough Transform space, wherein each value in the Hough Transform space is a log likelihood supported or opposed by each observation; and (c) identifying a potential moving traffic obstacle path by identifying a linear arrangement of locally maximum peak values in the Hough Transform space; establishing a communications link between the server and a device onboard a vehicle, the vehicle located on the road segment; transmitting to the device via the communications link a message comprising information about the potential moving traffic obstacle and instructions for avoiding the potential moving traffic obstacle, wherein the message is configured to alter a graphical user interface of the device or to automatically alter the course of the vehicle. In embodiments:

the instructions comprise route information configured for display on a GUI and configured to instruct a user to maneuver the vehicle based on the potential moving traffic obstacle;

the instructions comprise machine-readable instructions configured to cause an autonomous vehicle control system to maneuver the vehicle based on the potential moving traffic obstacle;

the device comprising a sensor is a fixed device monitoring the road segment or is a mobile device configured to be disposed within a vehicle traversing the road segment; and the method further comprises identifying a plurality of potential moving traffic obstacle paths by identifying a plurality of linear arrangements of locally maximum peak values in the Hough Transform space and consolidating the plurality of potential moving traffic obstacle paths.

In an aspect is a system comprising a processor coupled to a memory, the memory comprising machine-readable instructions configured to cause the processor to carry out the following steps: (a) receiving a plurality of time and location combinations, each combination having an associated obstacle probability assigned based on data from a sensor; (b) applying a modified Probabilistic Hough Transform to the set of time and location combinations to obtain a Hough Transform space, wherein each value in the Hough Transform space is a log likelihood supported or opposed by each observation; and (c) identifying a potential moving traffic obstacle path by identifying a linear arrangement of locally maximum peak values in the Hough Transform space; a communications module coupled to the processor and configured to establish a communications link between the processor and a device in a vehicle and further configured to transmit an alert to the device, the alert generated by the processor based on the vehicle position and the alert containing instructions configured to cause the vehicle to maneuver based on a potential moving traffic obstacle path. In embodiments the system further comprises a mobile device comprising a sensor and configured to be positioned in the vehicle and communicate with the server.

In an aspect is a system comprising a server, the server comprising: a processor; a memory coupled to the processor, the memory configured to store program instructions for instructing the processor to carry out the methods as above. In embodiments, the system further comprises a mobile device comprising a sensor and configured to be positioned in the vehicle and communicate with the server.

These and other aspects of the invention will be apparent to one of skill in the art from the description provided herein, including the examples and claims.

DETAILED DESCRIPTION

Figure 1A:
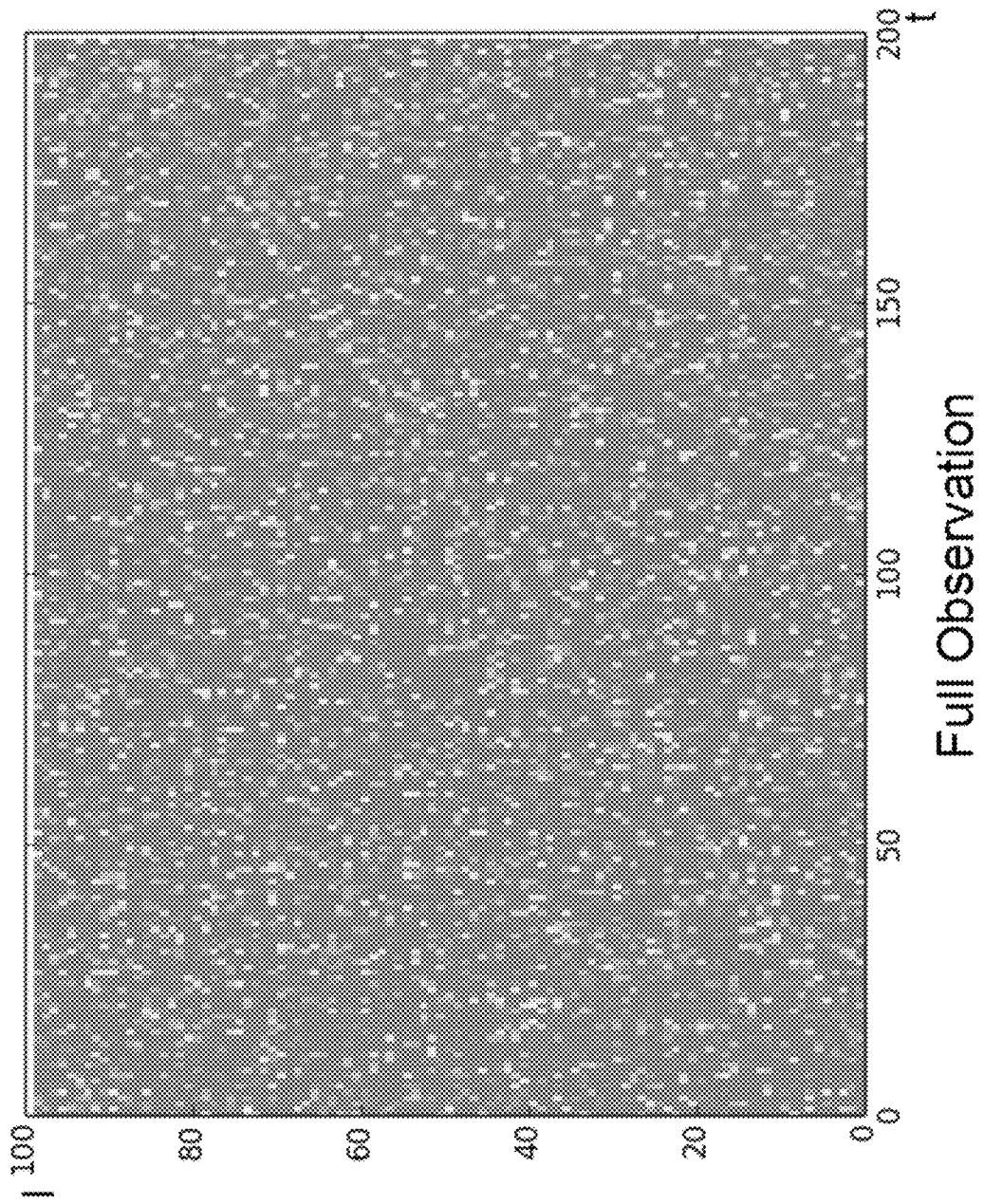
FIGS. 1A-1D (collectively, FIG. 1) provides simulated Ground Truth with Noise (FIG. 1A) and MTO Detection from Sparse Observations (FIGS. 1B, 1C, and 1D).
Figure 1B:
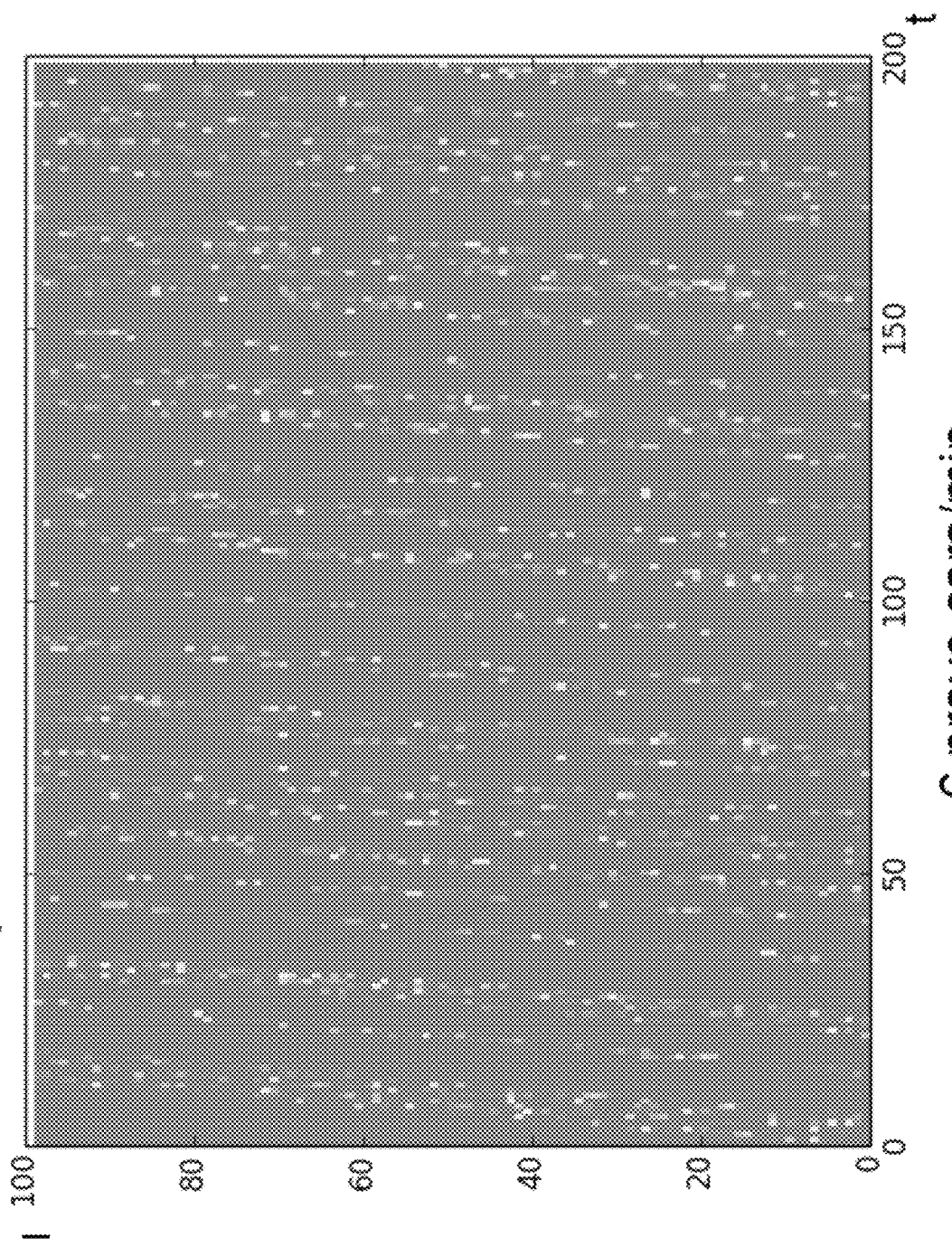
Figure 1C:
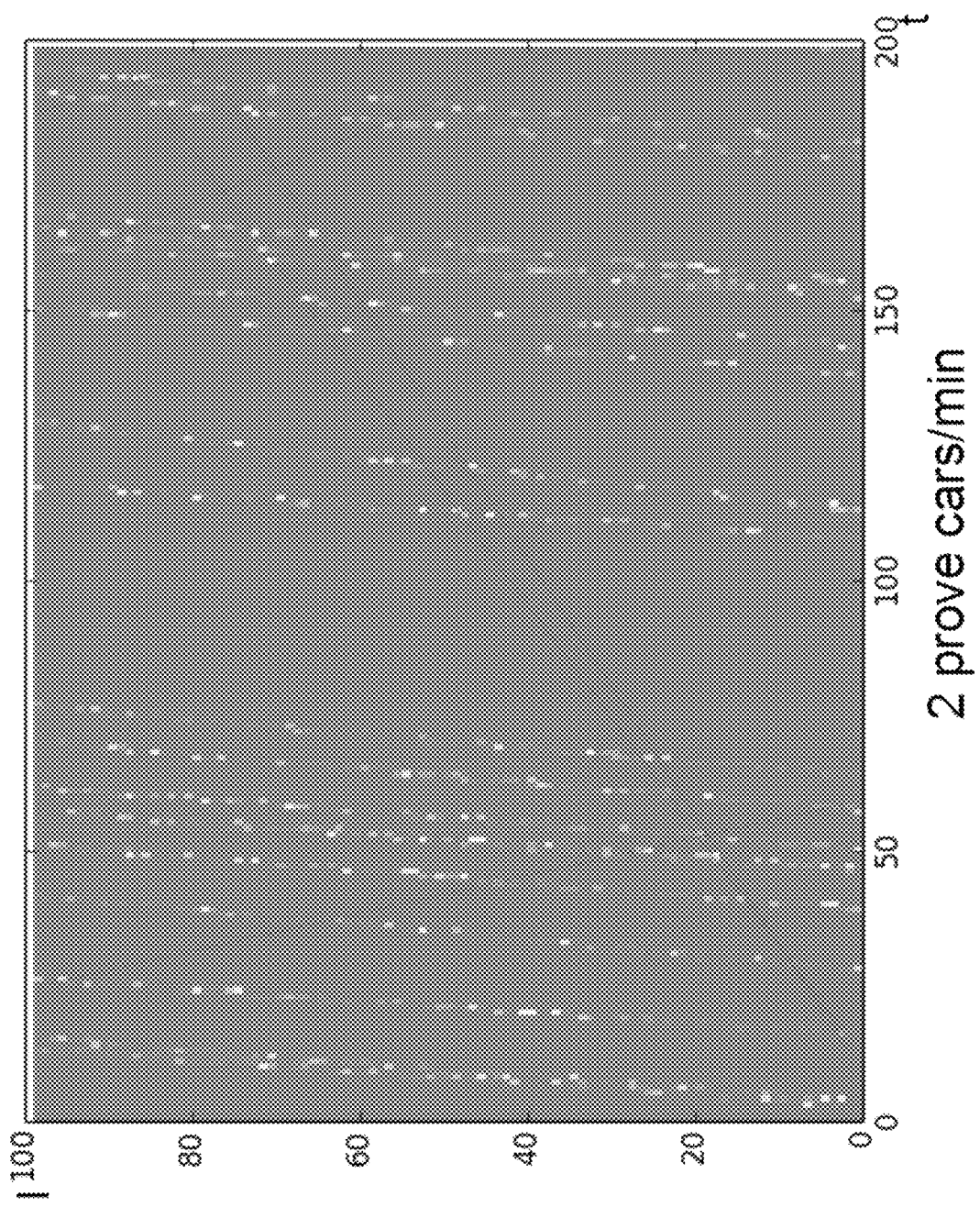
Figure 1D:
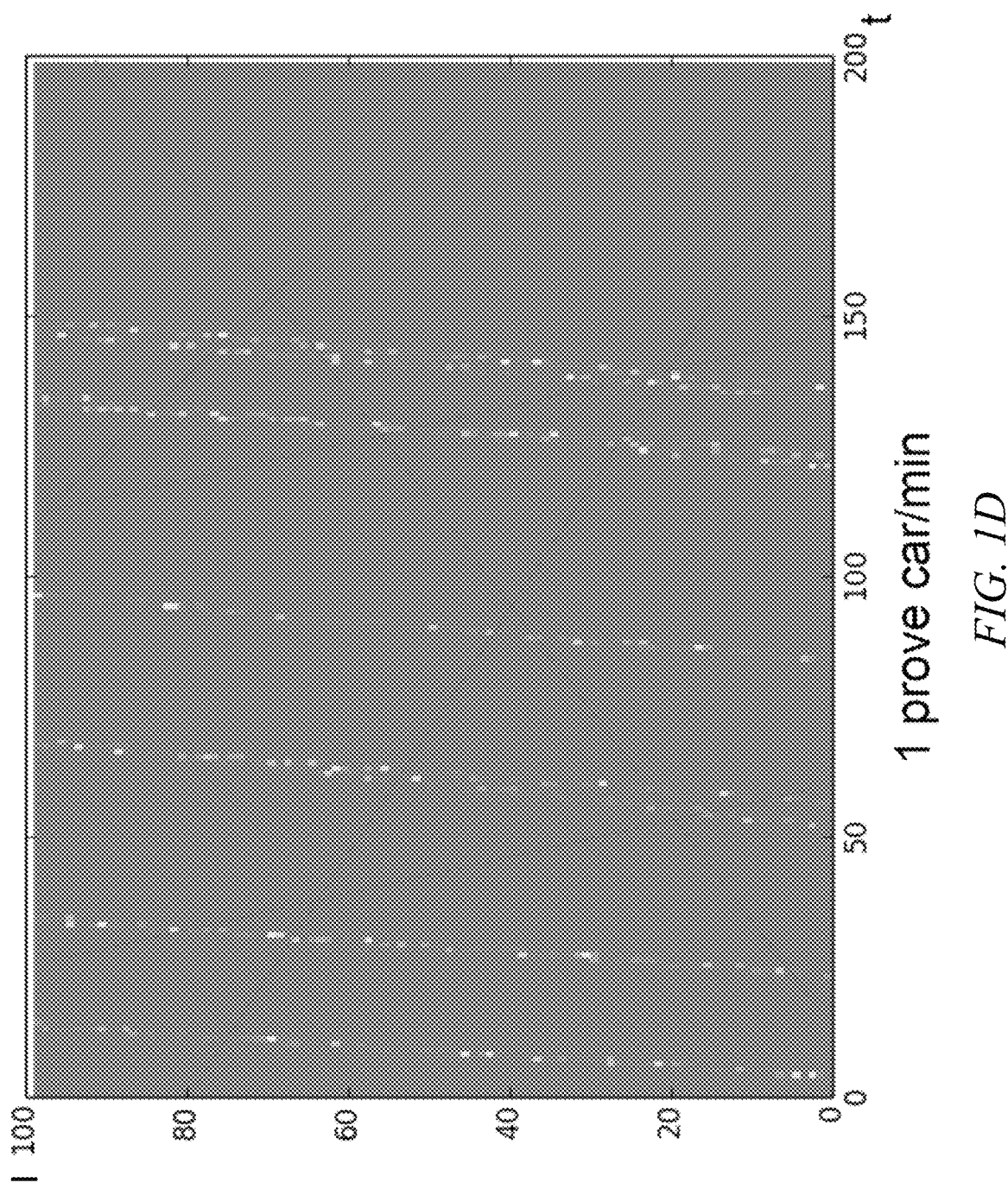

In aspects are devices configured to carry out the methods described herein. The devices may comprise a processor and a memory coupled to the processor, the memory configured to store program instructions for instructing the processor to carry out the method. Further details are provided herein. It will be appreciated, however, that certain components of such devices, and further certain steps of the associated methods, may be omitted from this disclosure for the sake of brevity. The omitted components and steps, however, are merely those that are routinely used in the art and would be easily determined and implemented by those of ordinary skill in the art using nothing more than routine experimentation, the general state of the art, and the disclosure herein. Throughout this specification, where hardware is described, it will be assumed that the devices and methods employing such hardware are suitably equipped with necessary software (including any firmware) to ensure that the devices/methods are fit for the described purpose.

Given relatively sparse and error-prone observational data of traffic obstacles, herein is described a Moving Traffic Obstacles (MTO) detection algorithm, system, and method extending an image analysis technique called Probabilistic Hough Transform for probabilistic observations as input. A variety of MTOs are possible depending on the context. Common MTOs include vehicles (e.g., tractors, trucks, etc.), people, animals, human-powered vehicles (carts, etc.), escort vehicles, maintenance vehicles, and the like. Such obstacles are to be contrasted, for example, with stationary traffic obstacles such as potholes and speed bumps. An MTO can be either known (i.e., occurring and observable) or potential (i.e., likely to occur based on historical observations), but for the purposes herein these are not distinguished—i.e., a "potential MTO" and an "MTO" are terms used interchangeably unless otherwise indicated or clear from the context.

In order to detect MTOs from sparse/frugal sensor data, such as those from probe cars, various issues were identified and addressed, at least in part and by the various embodiments, some of which are described below and herein. By "sparse" or "frugal" is meant that the data originates from probe cars or other data sources that are specialized for the task, and this is to be contrasted with large scale (dense) data collection methods such as passive monitoring of nominal traffic or background monitoring on generalized devices (such as cellular phones) located in vehicles.

The invention described herein provides systems and methods for anticipating and avoiding MTOs. MTOs are often not single but multiple instances of the same obstacle, with each instance separated by random or regular periods of time. It is observed that simply applying linear regression of an MTO track/path does not work well or at all with multiple MTOs, hence the need for a better approach at anticipating and avoiding MTOs. By "avoiding" in this context is meant, for example, relaying appropriate manoeuvre data to the vehicle prior to an encounter with an MTO, with enough forewarning that the vehicle is able, either by manual driver actions or by autonomous vehicle control actions, to execute a recommended maneuver and avoid the MTO (whether or not the MTO is, in fact, present when the vehicle reaches the associated location of the anticipated MTO).

One aspect of the invention involves spatiotemporal sparseness in the data—i.e., observations are opportunistically performed by probe cars, etc. In embodiments, missing observational data are assumed in the time and location. The data are pixelated, with each pixel representing a time and location of the observation. Observations may include errors in their time and location, especially in location due to the limitation of GPS accuracy (i.e., there are spatiotemporal errors and tolerance in the data). Known and later developed error correction techniques are suitable for correcting in whole or in part the spatiotemporal errors. For example, one method for correcting location errors involves the use of cellular signals to refine the location measurement.

A suitable tolerance for naturally variable speeds of MTOs may be incorporated into the modelling and calculations described herein. The system may maintain or access a reference database of known MTO classifications (e.g., vehicle, animals, carts, etc.) and associated variations in speed for each classification. This data may be stored on a server associated with the invention or may be stored in a remote server that is accessible by the systems described herein. The reference database may be built from direct observational data or from reference/historical data obtained from third parties.

An observation of a traffic obstacle can be probabilistic to give the information of confidence in classification from lower-level sensor data features. In embodiments, the information of non-existence of potential MTOs is also a source of information to improve traffic predictability. For example, use of probability allows this by assigning a low probability to a MTO observation.

Figure 2:
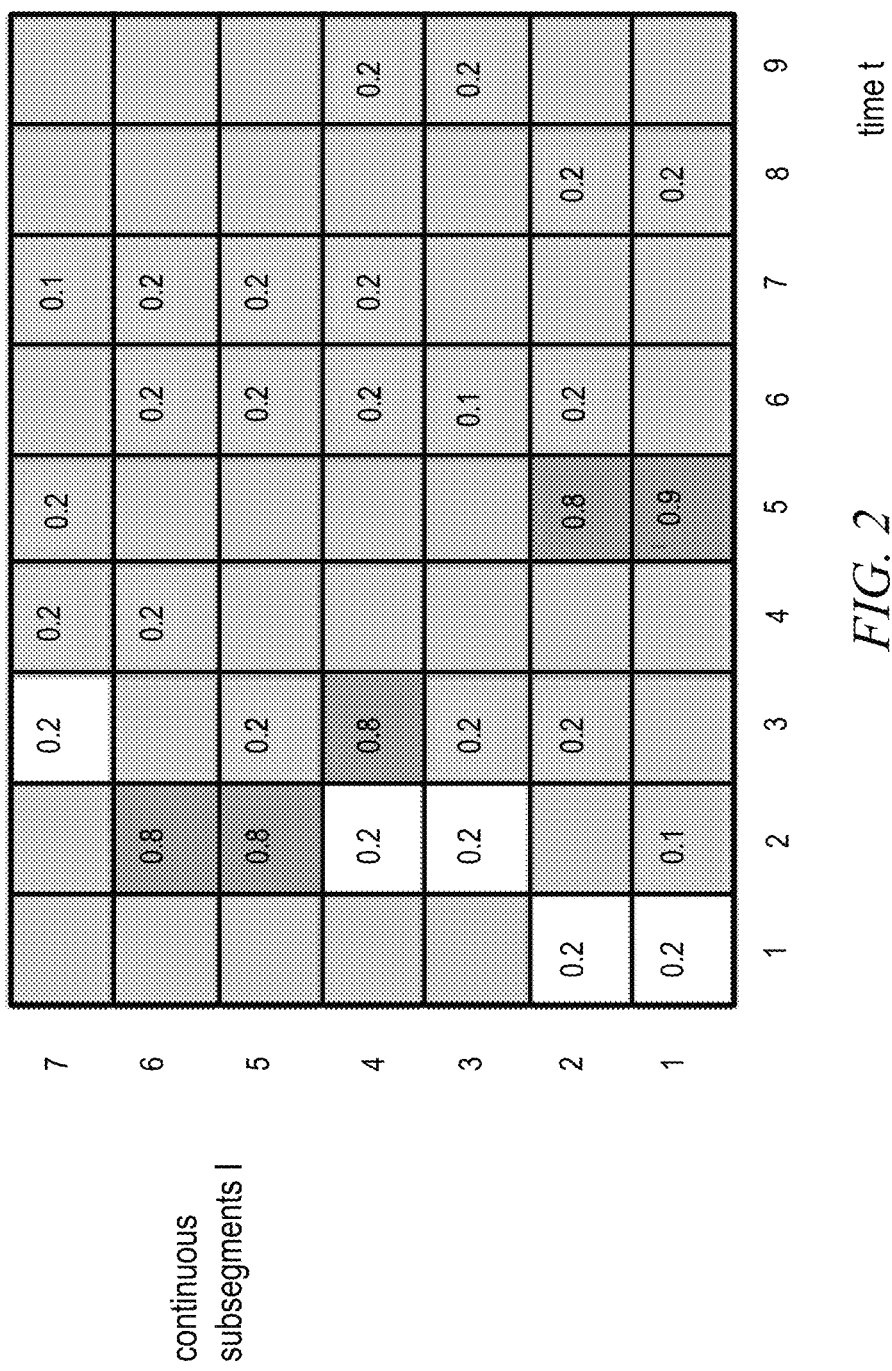
FIG. 2 provides an example table providing spatiotemporal data as input.
Figure 3:
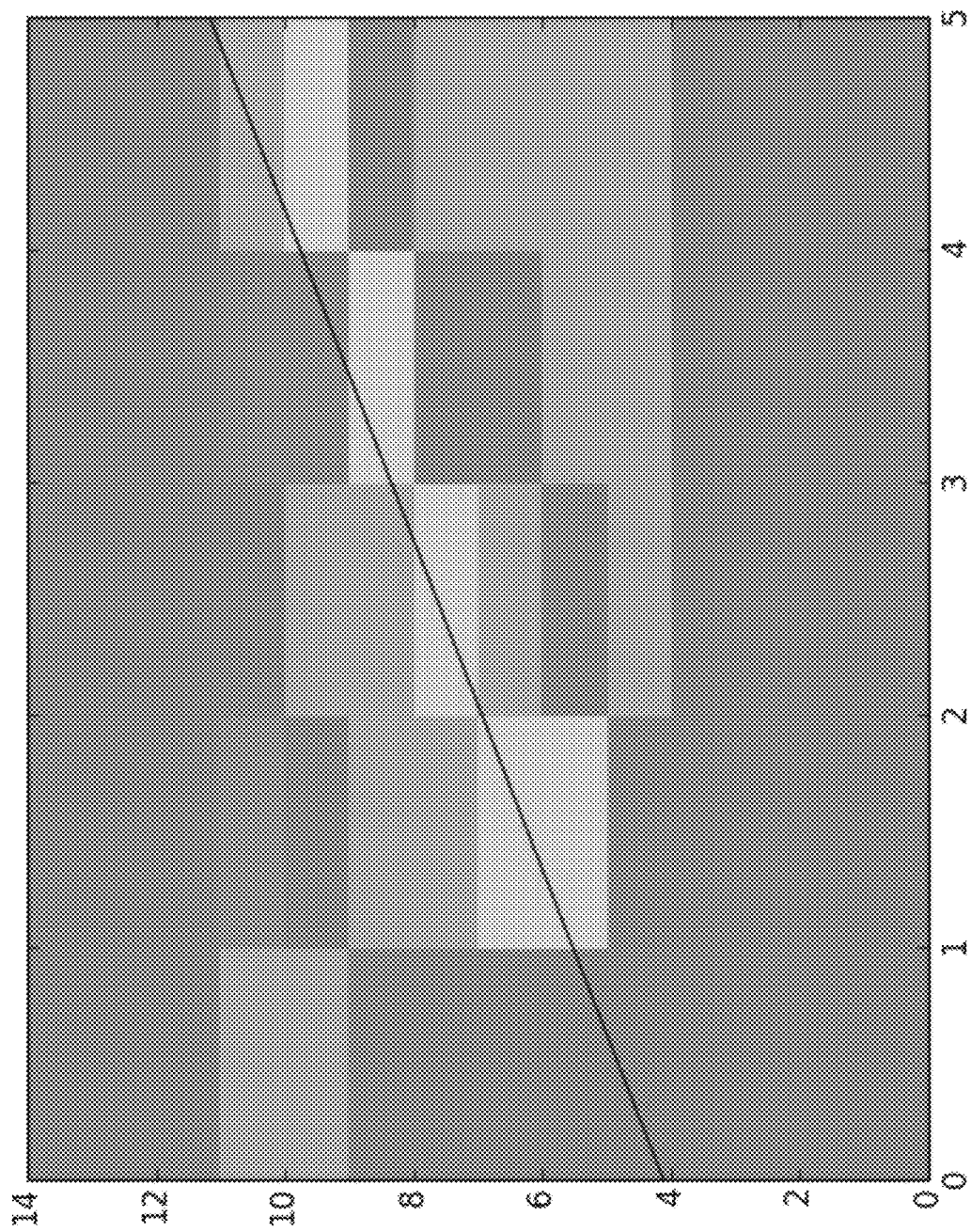
FIG. 3 provides an example table providing output of a detected MTO.

In embodiments the methods involve generating a table with equally segmented time (elapsed time) and location (length from the start point of the road segment) as row and column headers in a general concept. Each cell in the table represents a spatiotemporal probability—i.e., that there is an object (moving or stationary) at the specific time and location of the cell. An example table is provided in FIG. 2, illustrating the type of input that is suitable in embodiments for the methods described herein. FIG. 3 then provides an example output from such methods. FIGS. 2 and 3 are described in more detail in the Examples below.

In embodiments, due to the sparse population of data, the system can employ an interpolation algorithm (a variety of which are known) for missing observations.

The systems and methods provide longer-term prediction capability for recurring MTO events with similar conditions (e.g. walking crowds for weekdays, seasonal cows, water push carts after periods of no-rain, etc.). The systems and methods also provide for near-term predictions that allow, for example, estimated times of arrival (e.g., expected MTO in next 1 hour, so ETA can be varied accordingly). Such information can be used, e.g., by a human operator at a data collection center, or by an autonomous vehicle control system when determining a route, or by a route determination software (e.g., GPS system), or combinations thereof, or other users as appropriate.

The systems and methods enable maneuvering a vehicle in a roadway having potential traffic obstacles. In embodiments, the system comprises a server, the server comprising a processor coupled to a memory. The system may use localized architecture, whereby the server components and the various functionalities of the system are in a single location, or distributed architecture (e.g., cloud architecture), whereby the various functionalities are carried out by various components that may not be in a centralized location. The memory coupled to the processor comprises machine-readable instructions sufficient and configured to instruct the processor and any other components to carry out the methods described herein.

The server is in electronic communication with a distributed network (e.g., the Internet via a physical connection or a wireless connection) and comprises a communications module configured to establish communications links between the server and external devices. The external devices may be, for example, general purpose mobile devices (cell phones, tablets, etc.), dedicated mobile devices, or a device physically incorporated into a vehicle (e.g., an on-board system integrated into the power and communications systems of a vehicle), and may be in any location having a connection to the distributed network, such as in a vehicle provided that the vehicle is periodically or continuously within communications range of a cellular network. Thus, in embodiments, the server via the communications module is configured to establishing a communications link between a server and a device in a vehicle.

Communications between the server and the device may be carried out via any suitable data communications channel, such as cellular signals (e.g., 3G, 4G, etc.), Wi-Fi, Bluetooth, and the like. Such communications are suitable for two-way transmissions of data. Data transmitted from the device to the server may include, for example, positional data (e.g., GPS coordinates), movement data (e.g., speed and direction), data obtained from a vehicle (e.g., speedometer readings, etc.), and the like. Such data, particularly positional data, can be used by the server to determine whether the vehicle is in the vicinity of, or moving toward, an MTO, and is therefore in need of receiving instructions for avoiding or otherwise minimizing interaction with the MTO. Data transmitted from the server to the device may include alerts, software updates, maps, MTO data, and the like.

The alerts described herein are configured to cause a vehicle to maneuver based on a potential moving traffic obstacle path. In embodiments, the alert is configured (e.g., comprises suitable machine-readable instructions) to alter a user interface (e.g., change a graphical user interface) to display or otherwise relay information suitable to cause a driver to initiate a maneuver. The user interface may be on the device itself or may be a component integrated into the vehicle and configured to display information for a driver/user (e.g., a dashboard display, a heads-up display, an audio system, etc.). In embodiments, the alert is configured to cause an autonomous vehicle control system integrated into the vehicle to initiate a maneuver, the maneuver being selected based on the MTO identified as within proximity of the vehicle. The instructions may involve altering a route, changing lanes in a road segment, increasing or decreasing speed, as well as other options.

In embodiments, the device is a mobile device and is configured to communicate with components integrated into the vehicle, such as via Bluetooth or the like, such that the device can relay instructions to such components. In embodiments, the alert is generated when the vehicle comes into proximity of the potential moving traffic obstacle path. By "proximity" is meant that the vehicle is near to a MTO (as recorded in the database of MTOs maintained on the server or elsewhere), and this may be dictated by a predetermined numerical range or by a contextual range. For example, a vehicle may be in proximity when it is in the same road segment as the MTO, or within a set distance such as within 5, 10, 15, 25, 50, or more than 50 meters of the MTO. The proximity definition may be affected by the context, such as the road segment size, vehicle speed, population density, road segment speed limit, weather conditions, and the like.

The database of MTOs, stored on the server or otherwise, is calculated by the methods described herein using collected data. In embodiments, the data are sensor data collected by one or more sensors, and such data is transmitted from the sensors to the server (e.g., via a distributed network or, less desirably, via a physical network connection) in batches or in real-time. In embodiments, the sensor data corresponds to observations of one or more obstacles at one or more locations along the road segment over a period of time. In embodiments, the sensor data is obtained from one or more sensors selected from: an on-board sensor on one or more probe vehicles as the one or more probe vehicles traverses the road segment; a fixed location sensor monitoring the road segment; and a combination thereof. In embodiments, the sensor is selected from a camera, accelerometer, gyroscope, or combinations thereof.

The MTOs are stored in a potential moving traffic obstacle path database. The MTO database contains, for each MTO entry, data selected from: a path of the MTO (e.g., the most common or likely path along the road that the MTO takes), identifying features of the MTO (e.g., the type of MTO, such as human, animal, vehicle, etc.), frequency of observation of the MTO, historical observations of the MTO, and the like. Any or all of these data can be used by the system to further refine recommendations sent in the alert.

The methods herein comprise identifying an MTO by identifying a linear arrangement of locally maximum peak values in the Hough Transform space of the collected data. The methods may further comprising identifying a plurality of potential moving traffic obstacle paths by identifying a plurality of linear arrangements of locally maximum peak values in the Hough Transform space and consolidating the plurality of potential moving traffic obstacle paths. In embodiments the sensor data originates from one or more vehicles traversing the road segment, and wherein the one or more vehicles is a dedicated probe vehicle or is a non-dedicated vehicle having a mobile device configured to collect and transmit the sensor data. Imagery from fixed cameras, temporary cameras, and satellite data may also be used to determine MTOs.

In embodiments the sensor data is for a road segment, the sensor data corresponding to observations of an obstacle at a location along the road segment over a period of time. A road segment is a portion or road of any suitable length, wherein such length may be fixed throughout a system or roads or may vary based on the context. For example, in densely populated regions or regions with many intersections, the road segment may be relatively short such as a section of road that is 5, 10, 15, 20, 25, or 50 meters in length, or in the range of 5-100, or 5-50, or 5-25 meters. In more sparsely populated and rural areas, the section may be relatively longer such as 25, 50, 100, or 1000 meters in length, or in the range of 25-1000, or 25-500, or 25-100 meters. The period of time is appropriate for the road segment and may typically be on the scale of 0.1-10 minutes.

In embodiments, the methods involve determining of the MTO path, which involves receiving sensor data observations (as above, such as by a test vehicle containing a dedicated device or a mobile device), determining a set of grey scale pixels potentially missing based on the observations, each pixel representing a time and location combination, and having an associated obstacle probability assigned based on the sensor data, and applying a modified Probabilistic Hough Transform to the set of gray scale pixels to obtain a Hough Transform space, wherein each value in the Hough Transform space is a log likelihood supported or opposed by each observation. In this process there is created another layer (alternatively called a mask layer) for specifying whether there is data or not, in addition to the main layer specifying the probability of the MTO (or edge in image processing terms). For each pixel, the first layer says if we have observation of the pixel or not, and then the second layer says the probability of the existence of an edge at the pixel, where a whiter (closer to 0) value indicates non existence and a blacker value (closer to 1) indicates its existence. From the Hough Transform space, MTOs can be identified by identifying a linear arrangement of locally maximum peak values in the Hough Transform space. The MTO is then added to the MTO database (i.e., the potential MTO database) and vehicles are alerted as appropriate when in proximity of the MTO.

In some alternative embodiments, continuous communications with the server may be impossible or impracticable or undesirable. In such cases, the mobile device (i.e., the device in the vehicle, or components integrated into the vehicle capable of carrying out the methods of the invention) may periodically download a dataset containing MTOs, algorithms, and/or other data/instructions from a server such that the device can operate (with reduced or full capacity) in the absence of real-time communications with the server.

In an embodiment, an algorithm according to the invention works as follows. A T×L (time by location) matrix is obtained for MTO probability distribution. This can be obtained from prior probability distribution and observations with known error distribution, for example. Then, the system extracts lines well-explained by MTO probability distribution in the T×L matrix. Candidates for line of best fit can be determined from high MTO probability points, within an MTO speed range assumption. Such determinations can be based on Probabilistic Hough Transform, for example by the use of geometric means of MTO probabilities in the voting process. Finally, similar lines of best fit can be optionally consolidated. Complete-linkage clustering (furthest neighbor clustering) in the parameter space of a (MTO speed) and b (MTO position at t=0) is an example for such consolidation.

Figure 4:
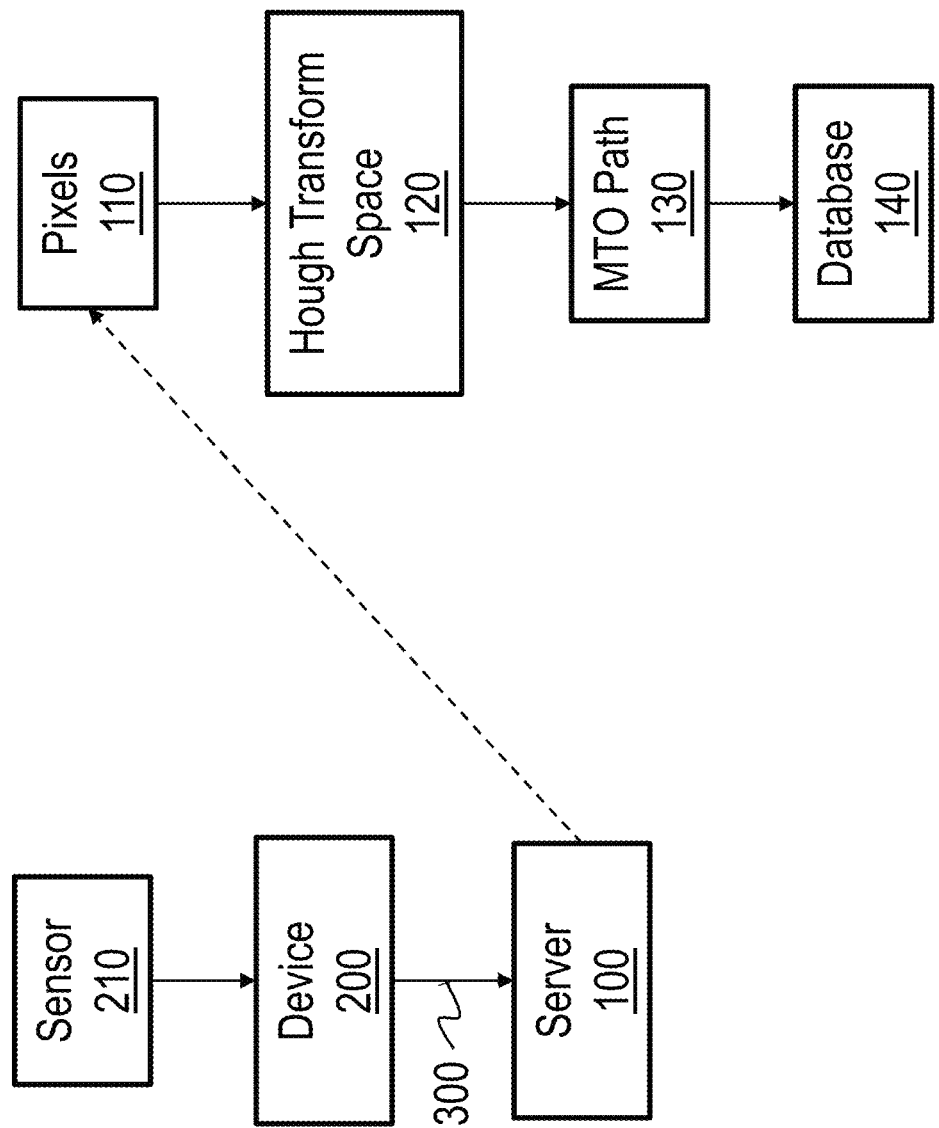
FIG. 4 provides an example flow chart for creating a potential moving traffic obstacle database.

With reference to FIG. 4, a method for creating an MTO database is provided. Sensor 210 may be part of device 200 or may be separate from device 200 but in the latter case it is capable of communicating sensor data to device 200 via a physical network, wireless network, or other connection. After receiving sensor data from sensor 210, device 200 establishes communication linkage 300 with server 100. Server 100 receives the sensor data from device 200 via linkage 300, and then processes the data internally. The processing includes establishing greyscale pixels 110, converting the data into Hough Transform Space 120, establishing an MTO path 130, and then adding the MTO path to MTO database 140. In embodiments all of these steps are carried out internally by server 100, but it is also possible to have certain such steps carried out externally such as in a cloud computing configuration.

Figure 5:
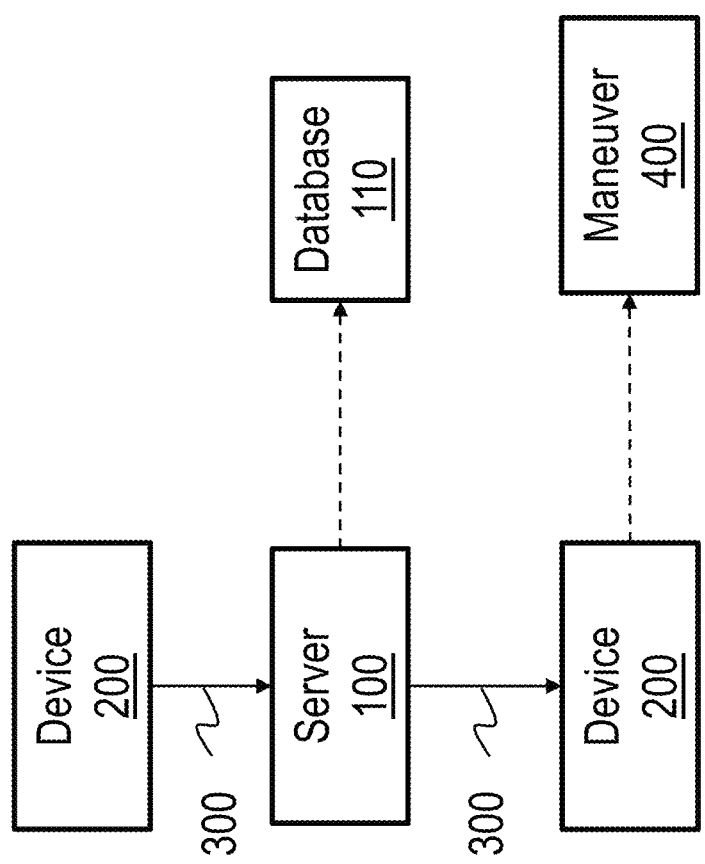
FIG. 5 provides an example flow chart for a system causing a maneuver in a vehicle.

With reference to FIG. 5, a method for causing a vehicle to carry out a maneuver is provided. Device 200 is onboard a vehicle (not shown or labeled) and establishes communication linkage 300 with server 100. Over communication linkage 300, device 200 can report the vehicle's position, trajectory, speed, etc. to server 100. Server 100 cross-references such data with MTO database 110 and establishes whether the vehicle is close to any known MTO. If the vehicle is in close proximity to an MTO, server 100 communicates a message to device 200 (again via linkage 300), the message being configured to cause the vehicle to execute maneuver 400 (e.g., via a change to a GUI and/or via instructing an autonomous vehicle control system).

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. The equations and algorithms provided herein are provided merely to illustrate the concepts of the invention and are not meant to be limiting unless such limitation is clearly indicated or evident from the context. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Example 1

In an example method, traffic obstacle observations are assumed as a set Y observed probabilities of MTO obtained by some sensors, such as smartphone-based sensing applications. Equation 1 provides an example for the set of observed probabilities.

$$Y^{observe} \stackrel{def}{=} \{P(\vec{y}_{t,l} | \vec{x}_{t,l}) | \exists t \in T, \exists l \in L\}$$
Equation 1: Definition of Input Observations where $\vec{x}_{t,l}$ is the existence event of a traffic obstacle, which is potentially a moving traffic obstacle (MTO), and $\vec{y}_{t,l}$ is the observation event of it, at time t and location 1. Here, T is a finite set of continuous time periods with the same duration from $t_0$ to $t_n$ of the observations. L is a finite set of road segments along with a directed, continuous road, with the same length from $l_0$ to $l_n$. The $P(\vec{y}_{t,l} | \vec{x}_{t,l})$ represents the observed probability of an obstacle sensed to exist (labeled as an obstacle by such as a probabilistic classifier) at time period t (such as 13:03-13:04 on November 13) and location l, a segment of a directed road link (such as a 10 m segment at 300 m from the beginning of a specified road in a specified direction). This probability (such as 92%), or accuracy, of classification is usually measured from classification testing results with known existing obstacles.

The Moving Traffic Obstacle (MTO) detection described herein is based on the approach used in the Hough Transform. The Hough Transform has been known and used widely in the domain of image analysis for detecting shapes such as lines from image points or pixels, which are obtained from edge detection pre-processing. The main purpose of it is to group edge points, which are Potential MTO (MTO) observed by sensors, into shapes through a voting procedure over a set of parameterized shapes, which are MTO tracks. The process starts from the mathematical formulation called Probabilistic Hough Transform (PHT). Herein is defined a PHT, the log of the probability distribution function of a MTO defined by a MTO parameter as follows in Equation 2:

Definition of Probabilistic Hough Transform   Equation 2

$$H(\vec{h}) = \ln[P(\vec{h}|Y^{observe})] = \sum_{set \subseteq L} \ln[P(\vec{y}_{t,l}|\vec{h})] + \ln[P(\vec{y})] + C$$

The variable $\vec{y}_{t,l}$ is a specific observation at time t (in T) and location l (in L) in the observation set of MTOs $Y^{observe}$. The variable $\vec{h}$ is a specific point (or a specific MTO) in the parameter space for representing MTOs. The probability $P(\vec{y})$ denotes a priori probability of MTO existence, which is considered herein to be uniform to time and location.

While Hough Transform assumes its input as a matrix of binary (an existing pixel or not) data, herein it is extended to take probabilistic classification results of MTO as the input by defining $P(\vec{y}_{t,l}|\vec{h})$ as follows in Equation 3:

$$P(\vec{y}_{t,l}|\vec{h}) = P(\vec{y}_{t,l}|\vec{x}_{t,l})P(\vec{x}_{t,l}|\vec{h}_t) + \{P(\vec{y}_{t,l}|\vec{x}_{t,l})P(\vec{x}_{t,l}) + P(\vec{y}_{t,l}|\vec{x}_{t,l}^C)P(\vec{x}_{t,l}^C)\}$$
$$P(\vec{x}_{t,l}^C|\vec{h}_t)$$

Equation 3: Probability of a Probabilistic MTO Observation Given a MTO where $\vec{h}_t$ is an event of MTO existence at time t by the MTO $\vec{h}$.

The location of $\vec{h}_t$ is derived through the function $\mu_h$: T ↦ L defined by the parameter $\vec{h}$ at ($a_h$, $b_h$) in the MTO parameter space as follows:

$$\mu_h(t) = a_h t + b_h$$

While $P(\vec{y}_{t,l}|\vec{x}_{t,l})$ is the observation input defined in Equation 1, assuming an observation location error as a normal distribution ($\mu_h(t), \delta_h^2$) is given, there is also:

$$P(\vec{x}_{t,l}|\vec{h}_t) = \frac{1}{\sqrt{2\pi\delta_h^2}} \exp\left(-\frac{(l - \mu_h(t))^2}{2\delta_h^2}\right)$$

The first term in the right side of Equation 3 represents successful observation/non-observation while the second term represents a false-positive/negative case. Note that the slope ($a_h$ as the speed of MTO $\vec{h}$) and intercept ($b_h$ as the location of MTO $\vec{h}$ at time 0) in T×L can also be used as the parameters defining MTO $\vec{h}$ rather than using the Hesse normal form typically used in Hough Transforms. Vertical lines, meaning infinite speeds of MTO, would not exist and thus not be a problem in this case.

The outlined algorithm for detecting MTOs stays same as PHT, and can be simply defined as follows in Algorithm 1.

Algorithm 1: Moving Traffic Obstacles Detection

In: A set of MTO observations as probabilities as defined in Equation 1.

Out: A matrix of log of probability density in the MTO parameter space.

Initialize all elements of the MTO parameter space, $H(\vec{h})$ to zero.

For each observation of MTO $\vec{y}_{t,l}$:
  for each element $\vec{h}$ in the MTO parameter space:
    compute ln $[P(\vec{y}_{t,l}|\vec{h})]$ using Equation 3 and add to $H(\vec{h})$.

Actual implementation does not need to compute components of $P(\vec{y}_{t,l}|\vec{h})$ repeatedly but can cache and reuse for different $\vec{h}$.

Example 2

A set of real world data collected in a smartphone-based probe car project within Nairobi City County, as well as with simulated observation data are provided to further illustrate aspects of the invention.

In order to see the real world situation, there was conducted an actual data collection based on smartphone-based sensors mounted on 9 garbage trucks in Nairobi, Kenya. Data was also collected from the same number of probe-cars sharing some major routes when departing from the same depot, called Kaloheni Depot, in Nairobi, Kenya. Further, to extensively examine the expected behavior of detection, the proposed algorithm was evaluated on simulated data.

FIG. 1 shows an example result from simulation with 10 probe cars per 10 min (200 in T). While working well with more dense observation cases, MTO detection starts including more than half false detection with sparser observation, around 1 probe cars per min, depending on simulation setting and detection thresholds. In FIG. 1, straight lines in right indicate detected MTO with the top H(h) values.

FIG. 2 provides input observations. In the figure, the observations are a set o_{t,l} where t (time) in T is in the range $0 \leq t \leq t_n$ and l (location) in L is in the range $0 \leq l \leq l_n$ with a confidence p_{t,l} in the range $0 \leq p \leq 1$ and an observation error range in L with a normal distribution (l, $\sigma^2$). In this situation, the following equation holds:

$$p(o_{t,l}|x_{t,l}) = p(o_{t,l}|x_{t,l}) \int_{l'-\frac{1}{2}}^{l'+\frac{1}{2}} f(y|l, \sigma) dy$$

wherein $x_{t,l}$ represents the observation of a TMO at time t and location l. Then, $p(o_{t,l}|x_{t,l}) = p_{t,l}$ and f is the probability density function of the location of an observation following a normal distribution (l, $\sigma^2$).

FIG. 3 provides an example output with the lighter coloured squares representing a higher probability of finding an MTO. Thus a line of best fit can be drawn ($R^2 = 0.9172$ in this instance) which shows the spatiotemporal path of a MTO.

What is claimed is:

1. A method for maneuvering a vehicle in a roadway having traffic obstacles, the method comprising:
  establishing a communications link between a server and a device in a vehicle; and
  communicating an alert to the device, wherein the alert is configured to cause the vehicle to maneuver based on a moving traffic obstacle path, wherein the moving traffic obstacle path is determined based on sensor data for a road segment, the sensor data corresponding to observations of an obstacle at a location along the road segment over a period of time;
  wherein determination of the moving traffic obstacle path comprises:
    receiving the sensor data for the road segment by a server via a network;
    determining a set of gray scale pixels based on the observations, each pixel representing a time and location combination, and having an associated obstacle probability assigned based on the sensor data;
    applying a modified Probabilistic Hough Transform to the set of gray scale pixels to obtain a Hough Transform space, wherein each value in the Hough Transform space is a log likelihood supported or opposed by each observation; and identifying the moving traffic obstacle path by identifying a linear arrangement of locally maximum peak values in the Hough Transform space.

2. The method of claim 1, wherein the sensor data is obtained from one or more sensors selected from: an onboard sensor on one or more probe vehicles as the one or more probe vehicles traverses the road segment; a fixed location sensor monitoring the road segment; and a combination thereof.

3. The method of claim 1, wherein the sensor data corresponds to observations of one or more obstacles at one or more locations along the road segment over a period of time.

4. The method of claim 1, wherein the alert is generated when the vehicle comes into proximity of the moving traffic obstacle path, and wherein the alert is configured to alter a user interface to display information suitable to cause a driver to initiate a maneuver, or wherein the alert is configured to cause an autonomous vehicle control system to initiate a maneuver.

5. The method of claim 1, wherein the potential moving traffic obstacle path is stored in a moving traffic obstacle path database.

6. The method of claim 1, wherein the communication is configured to cause a change in a graphical user interface on the device such that a user is notified of the moving traffic obstacle and is further notified of a suggested maneuver based on the moving traffic obstacle.

7. The method of claim 1, wherein the communication is configured to cause an autonomous vehicle control system to maneuver based on the moving traffic obstacle.

8. The method of claim 1, wherein the sensor data originates from one or more vehicles traversing the road segment, and wherein the one or more vehicles is a dedicated probe vehicle or is a non-dedicated vehicle having a mobile device configured to collect and transmit the sensor data.

9. The method of claim 1, wherein the sensor data is from a camera, accelerometer, gyroscope, or combination thereof.

10. A method for maneuvering a vehicle in a roadway having traffic obstacles, the method comprising:

receiving sensor data for a road segment, the sensor data corresponding to observations of an obstacle at a location along the road segment over a period of time;

determining a set of gray scale pixels based on the observations, each pixel representing a time and location combination, and having an associated obstacle probability assigned based on the sensor data;

applying a modified Probabilistic Hough Transform to the set of gray scale pixels to obtain a Hough Transform space, wherein each value in the Hough Transform space is a log likelihood supported or opposed by each observation;

identifying a moving traffic obstacle path by identifying a linear arrangement of locally maximum peak values in the Hough Transform space;

adding the moving traffic obstacle path to a moving traffic obstacle database;

communicating an alert to a device in a vehicle, wherein the communication comprises the moving traffic obstacle path and is configured to cause the vehicle to maneuver based on the moving traffic obstacle path.

11. A method for instructing a vehicle to maneuver in a roadway, the method comprising:

processing, by a server, sensor data received by the server from at least one device comprising a sensor, the sensor data corresponding to observations of an obstacle at a location along a road segment over a period of time, the processing comprising the steps:

(a) determining a set of gray scale pixels based on the observations, each pixel representing a time and location combination, and having an associated obstacle probability assigned based on the sensor data;

(b) applying a modified Probabilistic Hough Transform to the set of gray scale pixels to obtain a Hough Transform space, wherein each value in the Hough Transform space is a log likelihood supported or opposed by each observation; and (c) identifying a moving traffic obstacle path by identifying a linear arrangement of locally maximum peak values in the Hough Transform space;

establishing a communications link between the server and a device onboard a vehicle, the vehicle located on the road segment;

transmitting to the device via the communications link a message comprising information about the moving traffic obstacle and instructions for avoiding the moving traffic obstacle, wherein the message is configured to alter a graphical user interface of the device or to automatically alter the course of the vehicle.

12. The method of claim 11, wherein the instructions comprise route information configured for display on a GUI and configured to instruct a user to maneuver the vehicle based on the moving traffic obstacle.

13. The method of claim 11, wherein the instructions comprise machine-readable instructions configured to cause an autonomous vehicle control system to maneuver the vehicle based on the moving traffic obstacle.

14. The method of claim 11, wherein the device comprising a sensor is a fixed device monitoring the road segment or is a mobile device configured to be disposed within a vehicle traversing the road segment.

15. The method of claim 11, further comprising identifying a plurality of moving traffic obstacle paths by identifying a plurality of linear arrangements of locally maximum peak values in the Hough Transform space and consolidating the plurality of moving traffic obstacle paths.

* * * * *